(12) United States Patent
Sugiyama

(10) Patent No.: US 8,705,157 B2
(45) Date of Patent: Apr. 22, 2014

(54) OPTICAL SCANNING DEVICE

(75) Inventor: Yosuke Sugiyama, Gifu (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 9 days.

(21) Appl. No.: 13/426,729

(22) Filed: Mar. 22, 2012

(65) Prior Publication Data

US 2012/0307329 A1 Dec. 6, 2012

(30) Foreign Application Priority Data

Jun. 2, 2011 (JP) ................. 2011-124094
Jun. 2, 2011 (JP) ................. 2011-124095

(51) Int. Cl.
*G02B 26/08* (2006.01)
*G02B 26/10* (2006.01)
*G02B 26/12* (2006.01)

(52) U.S. Cl.
USPC ................ 359/204.1; 359/205.1; 359/212.2

(58) Field of Classification Search
None
See application file for complete search history.

(56) References Cited

U.S. PATENT DOCUMENTS

| 6,381,057 B1 | 4/2002 | Itabashi |
| 2006/0187513 A1 | 8/2006 | Ohsugi |
| 2007/0211137 A1 | 9/2007 | Yamazaki |
| 2009/0214259 A1* | 8/2009 | Uduki ........................... 399/151 |
| 2010/0124435 A1* | 5/2010 | Uduki ........................... 399/151 |

FOREIGN PATENT DOCUMENTS

| JP | H05-011161 U | 2/1993 |
| JP | H06-273681 A | 9/1994 |
| JP | 2001-066525 A | 3/2001 |
| JP | 2001-228425 A | 8/2001 |
| JP | 2006-234977 A | 9/2006 |
| JP | 2006-259368 A | 9/2006 |
| JP | 2007-240884 A | 9/2007 |
| JP | 2009-251308 A | 10/2009 |

* cited by examiner

*Primary Examiner* — Jade R Chwasz
(74) *Attorney, Agent, or Firm* — Baker Botts L.L.P.

(57) ABSTRACT

An optical scanning device is provided, which includes a casing including a supporting wall supporting a deflector, a first reflecting mirror supporting portion and a second reflecting mirror supporting portion that are opposed to each other across the deflector and extend from the supporting wall and a reinforcing wall configured to extend from the supporting wall, between the deflector and first and second light source units, so as to connect the first reflecting mirror supporting portion with the second reflecting mirror supporting portion, the reinforcing wall including a first through-hole configured such that a first laser beam emitted by the first light source unit toward the deflector and the second laser beam emitted by the second light source unit toward the deflector pass therethrough.

11 Claims, 13 Drawing Sheets

OPTICAL SCANNING DEVICE

CROSS-REFERENCE TO RELATED APPLICATION

This application claims priority under 35 U.S.C. §119 from Japanese Patent Applications No. 2011-124094 filed on Jun. 2, 2011 and No. 2011-124095 filed on Jun. 2, 2011. The entire subject matters of the applications are incorporated herein by reference.

BACKGROUND

1. Technical Field

The following description relates to one or more optical scanning devices having a plurality of light sources.

2. Related Art

A tandem image forming apparatus, which has a plurality of photoconductive bodies, includes an optical scanning device configured to expose the photoconductive bodies while scanning surfaces (scanned surfaces) of the photoconductive bodies with laser beams emitted by a plurality of light sources and then deflected by a deflector such as a polygon mirror, respectively.

As an example of such an optical scanning device, a device has been known that includes a plurality of light source units configured to emit respective laser beams, a deflector configured to reflect and deflect the emitted laser beams in a main scanning direction, a scanning lens configured such that the deflected laser beams are transmitted therethrough, a plurality of mirrors configured to reflect the deflected laser beams toward scanned surfaces, respectively, and a housing configured to accommodate the light sources, the deflector, the scanning lens, and the mirrors.

SUMMARY

Nowadays, in order to achieve a faster operation of an apparatus with the optical scanning device incorporated therein (e.g., to attain a higher printing speed of an image forming apparatus), the deflector for deflecting laser beams is required to operate faster.

However, as the deflector operates faster, a supporting wall of the housing that supports the deflector is more likely to vibrate. It might cause the deflector to vibrate and thereby unstably deflect the laser beams. As the laser beams are unstably deflected, incident positions of the laser beams on the scanned surfaces fluctuate in an unstable manner. Therefore, for instance, in the image forming apparatus having the optical scanning device incorporated therein, the surfaces of the photoconductive bodies might not be exposed in a favorable manner. Thus, it might result in lowered quality of an image formed by the image forming apparatus.

Further, in recent years, in order to downsize an apparatus with the optical scanning device incorporated therein, the optical scanning device (the housing) is also required to be downsized. Responsive to the requirement, a clearance between the scanning lens and a side wall of the housing becomes smaller. When the scanning lens is fixed to the housing with light curing resin, the light curing resin has to be exposed to light. However, in the optical scanning device having a small clearance between the scanning lens and the side wall of the housing, it is difficult to evenly irradiate the light curing resin with light.

When not evenly irradiated with light, the light curing resin does not evenly contract during a curing process. Therefore, the scanning lens might be fixed to face an undesired direction. It might lead to a situation where laser beams are not converged to form images on the scanned surfaces in a favorable manner. Therefore, for instance, in the image forming apparatus with the optical scanning device incorporated therein, the photoconductive bodies might not be exposed with a desired level of accuracy. Thus, it might result in lowered quality of an image formed.

Aspects of the present invention are advantageous to provide one or more improved techniques for an optical scanning device which techniques make it possible to suppress vibration of a supporting wall for supporting a deflector.

Additionally, aspects of the present invention are advantageous to provide one or more improved techniques for an optical scanning device which techniques make it possible to downsize the optical scanning device and enhance accuracy of attaching a scanning lens.

According to aspects of the present invention, an optical scanning device is provided, which includes a first light source unit configured to emit a first laser beam, a second light source unit configured to emit a second laser beam, a deflector disposed to face the first and second light source units in a predetermined direction, the deflector being configured to reflect and deflect the first laser beam emitted by the first light source unit and the second laser beam emitted by the second light source unit in a main scanning direction, a first reflecting mirror configured to reflect the first laser beam deflected by the deflector toward a first scanned surface, a second reflecting mirror configured to reflect the second laser beam deflected by the deflector toward a second scanned surface, a casing configured to accommodate the first light source unit, the second light source unit, the deflector, the first reflecting mirror, and the second reflecting mirror, the casing including a supporting wall configured to support the deflector, a first reflecting mirror supporting portion formed in a pillar shape to extend from the supporting wall, the first reflecting mirror supporting portion being configured to support the first reflecting mirror, a second reflecting mirror supporting portion formed in a pillar shape to extend from the supporting wall at a side opposed to the first reflecting mirror supporting portion across the deflector in a direction perpendicular to the predetermined direction, the second reflecting mirror supporting portion being configured to support the second reflecting mirror, and a reinforcing wall configured to extend from the supporting wall, between the deflector and the first and second light source units, so as to connect the first reflecting mirror supporting portion with the second reflecting mirror supporting portion, the reinforcing wall including a first through-hole configured such that the first laser beam emitted by the first light source unit toward the deflector and the second laser beam emitted by the second light source unit toward the deflector pass therethrough.

According to aspects of the present invention, optionally, the optical scanning device may further include a scanning lens configured such that a laser beam deflected by the deflector is transmitted therethrough. In this case, the casing may include a side wall extending from the supporting wall. Further, the supporting wall may include a lens holding portion that has a holding surface formed to face the side wall across the scanning lens, the holding surface being configured to hold the scanning lens attached thereto with light curing resin. Further, the side wall may include a second through-hole formed at a portion thereof opposed to the lens holding portion, the second through-hole being configured such that an inside of the casing is communicated with an outside of the casing therethrough. The optical scanning device may further include a through-hole covering member attached to the side wall so as to cover the second through-hole, the through-hole covering member being configured to serve as at least one of an optical component, a light detection unit, and a holding member that causes the casing to hold one of the optical component and the light detection unit.

BRIEF DESCRIPTION OF THE ACCOMPANYING DRAWINGS

Figure 6:
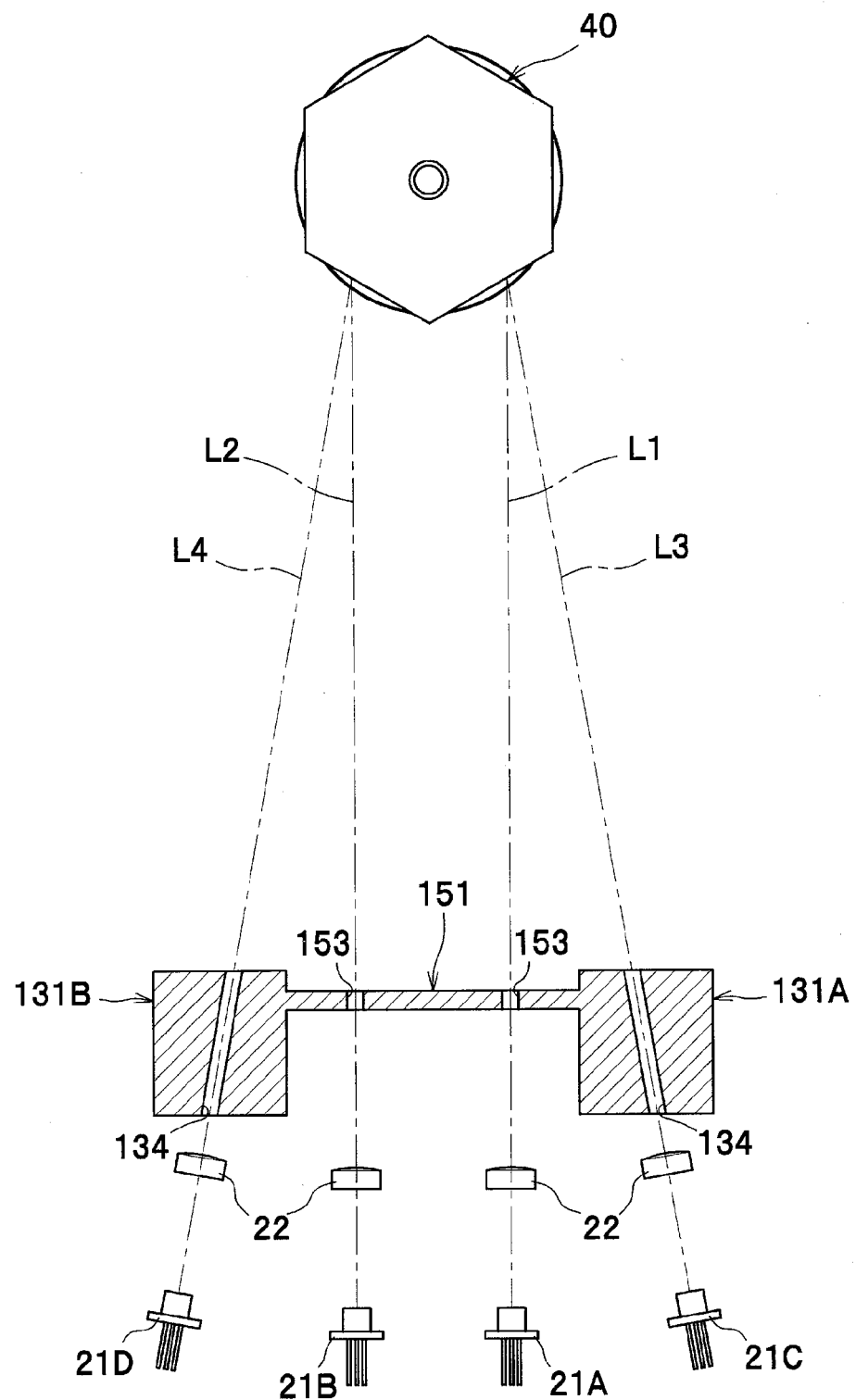

FIG. 6 partially shows an optical system of an optical scanning device in a modification according to one or more aspects of the present invention.

Figure 7:
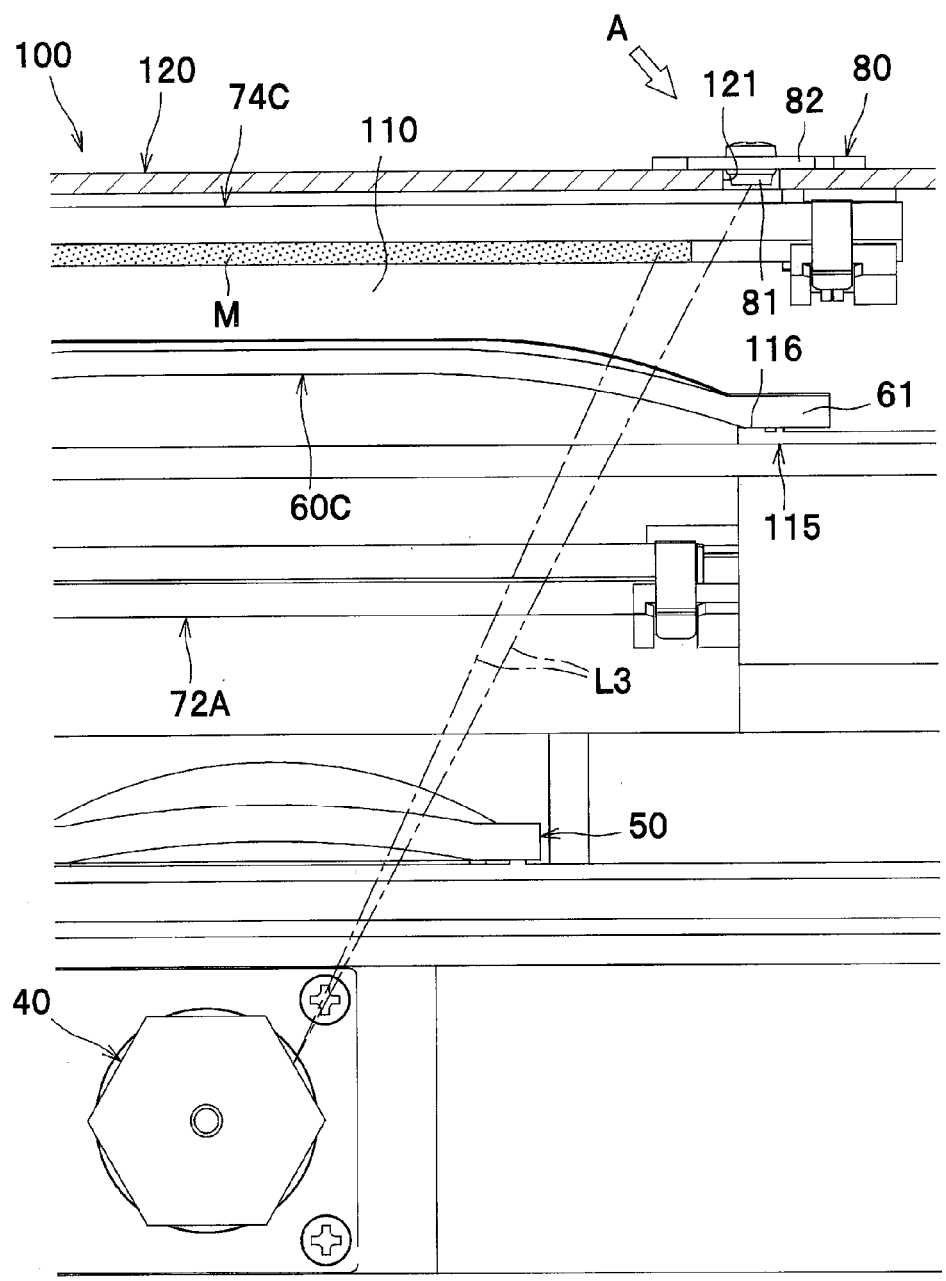

FIG. 7 is an enlarged top view partially showing the optical scanning device in the embodiment according to one or more aspects of the present invention.

Figure 8A:
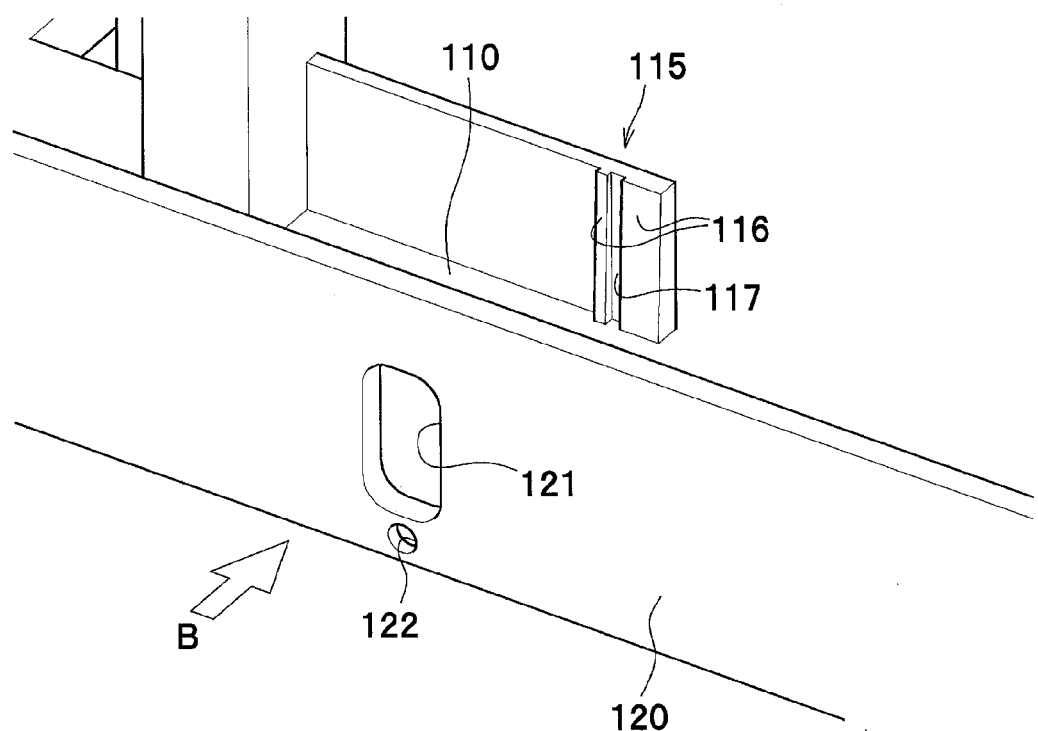

FIG. 8A is a perspective view of a part of the optical scanning device around a through-hole formed in a side wall when viewed along a direction A shown in FIG. 7 in the embodiment according to one or more aspects of the present invention.

Figure 8B:
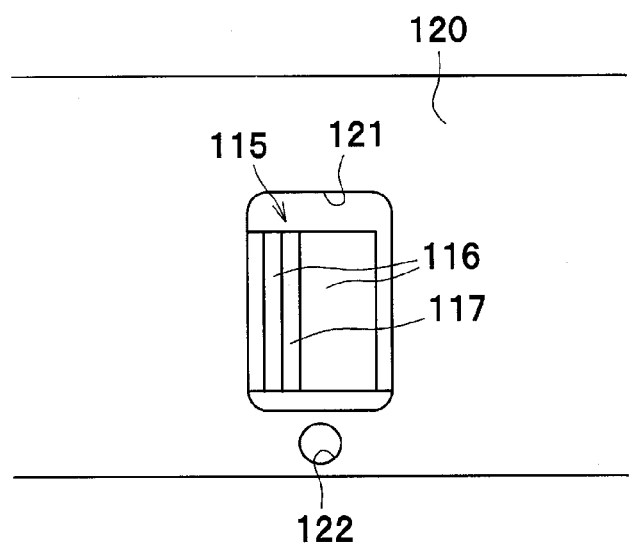

FIG. 8B is a side view of a part of the optical scanning device around the through-hole formed in the side wall when viewed along a direction B shown in FIG. 8A in the embodiment according to one or more aspects of the present invention.

Figure 9A:
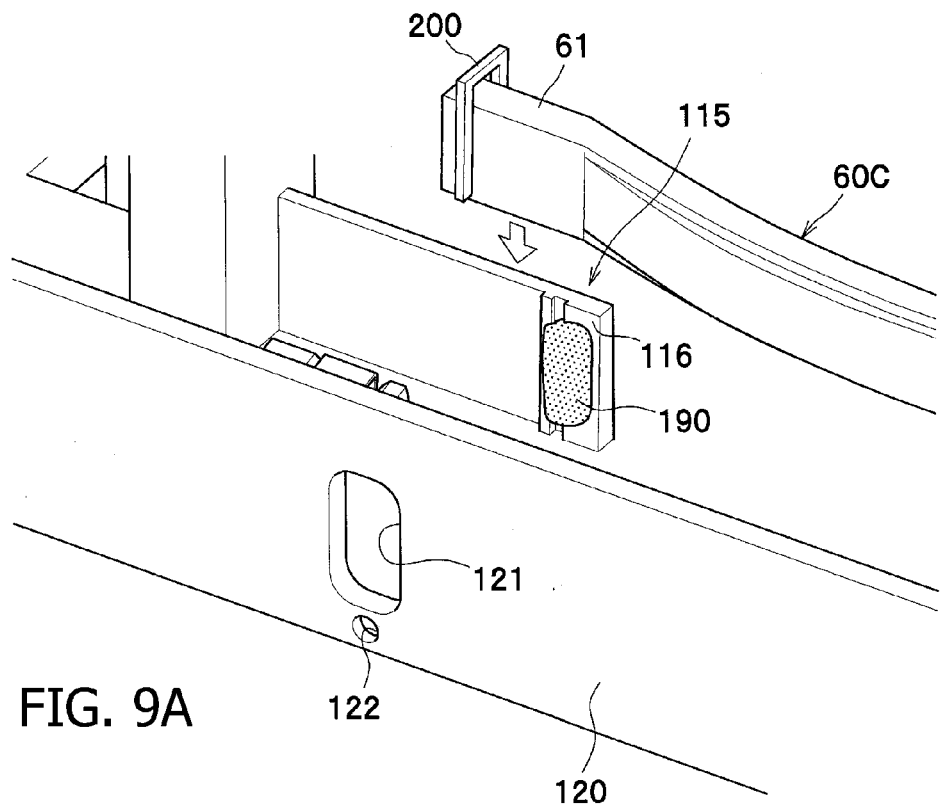
Figure 9B:
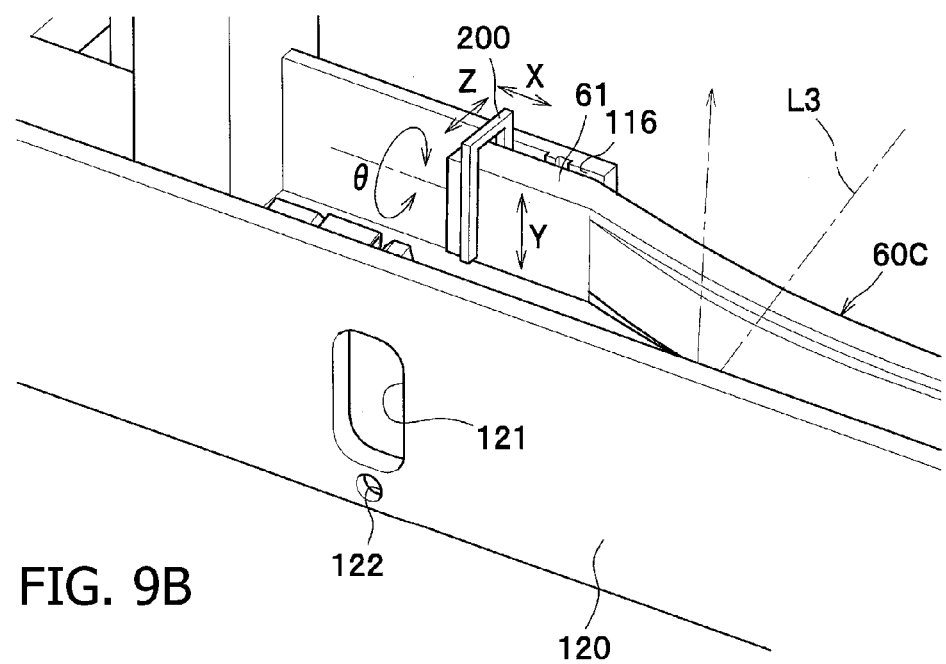

FIGS. 9A and 9B illustrate a lens positioning process to adjust the position of a second cylindrical lens in the embodiment according to one or more aspects of the present invention.

Figure 10A:
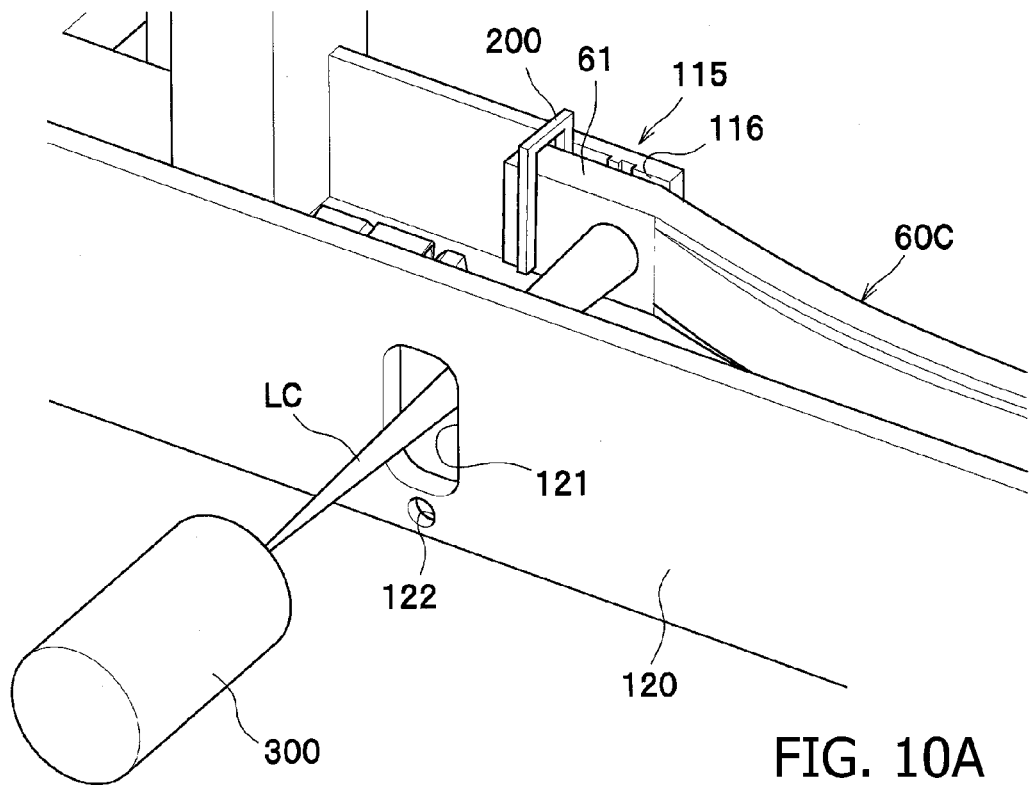
Figure 10B:
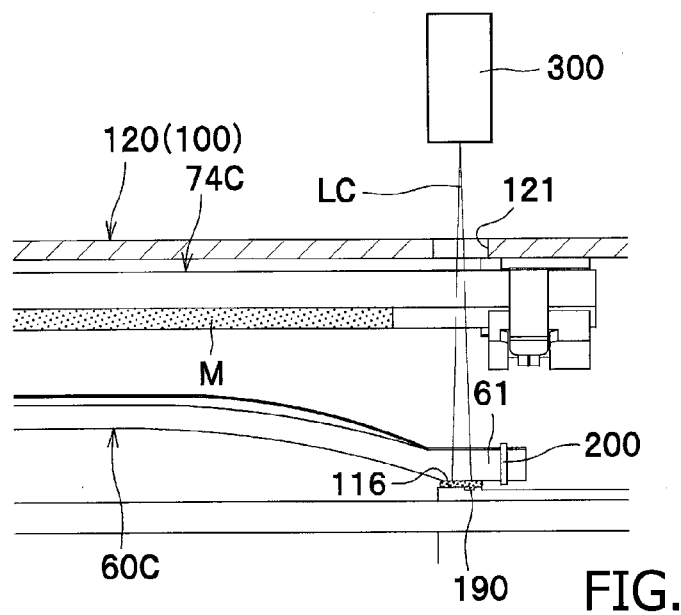

FIGS. 10A and 10B illustrate a lens fixing process to fix the second cylindrical lens in the embodiment according to one or more aspects of the present invention.

Figure 11A:
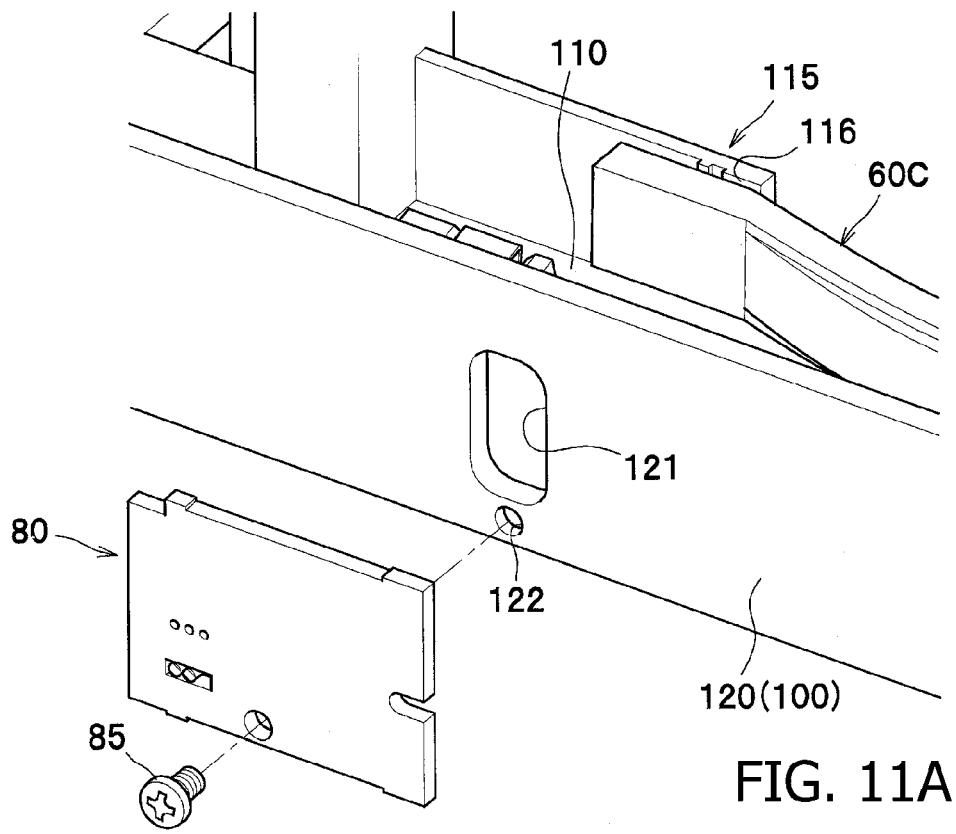
Figure 11B:
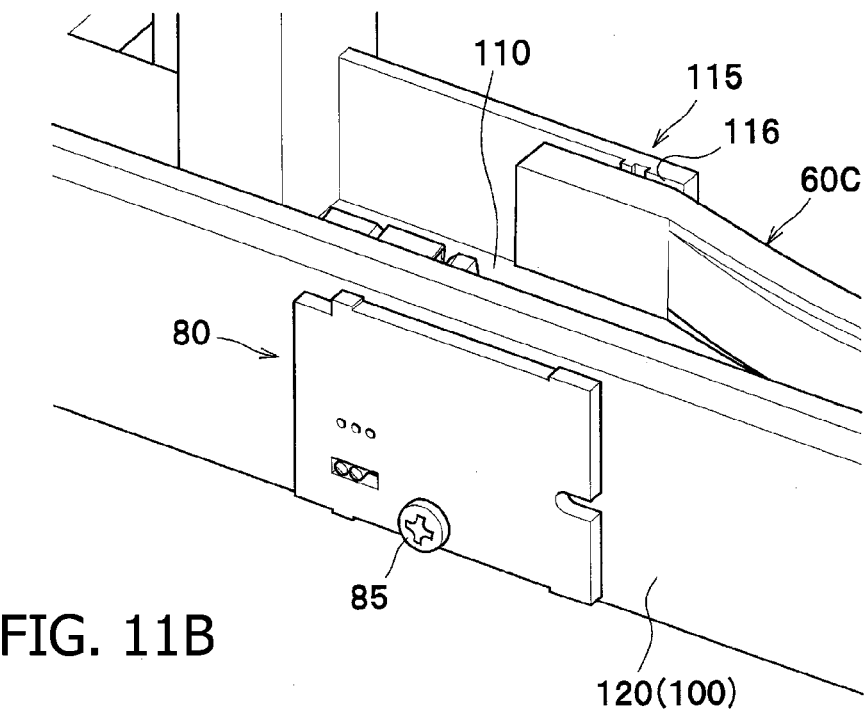

FIGS. 11A and 11B illustrate a part attaching process to attach a light detection unit 80 to the side wall so as to cover (close) the through-hole in the embodiment according to one or more aspects of the present invention.

Figure 12A:
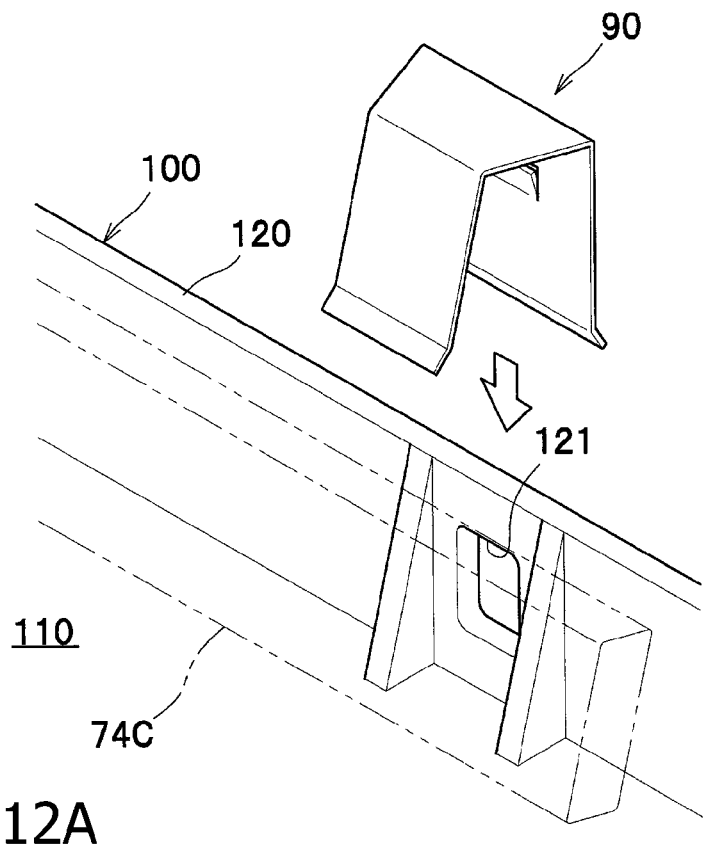
Figure 12B:
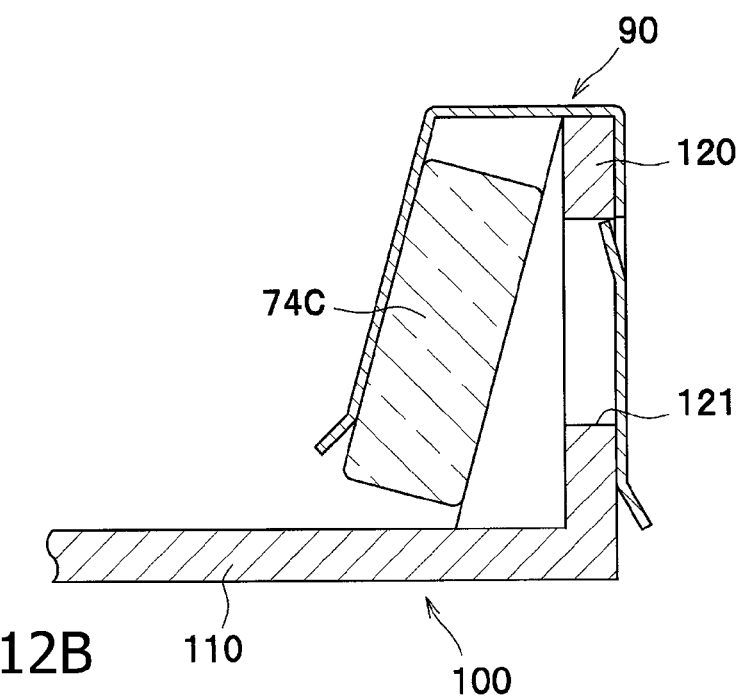

FIGS. 12A and 12B illustrate another configuration in which a holding member is attached to the side wall so as to cover (close) the through-hole in a modification according to one or more aspects of the present invention.

Figure 13:
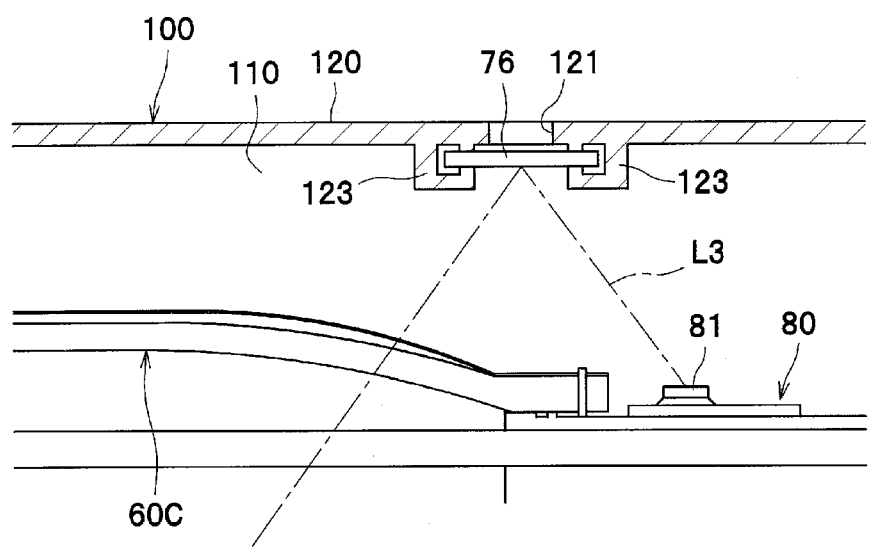

FIG. 13 illustrates another configuration in which an optical component such as a reflecting mirror is attached to the side wall so as to cover (close) the through-hole in a modification according to one or more aspects of the present invention.

DETAILED DESCRIPTION

It is noted that various connections are set forth between elements in the following description. It is noted that these connections in general and, unless specified otherwise, may be direct or indirect and that this specification is not intended to be limiting in this respect.

Hereinafter, an optical scanning device 1 of an embodiment according to aspects of the present invention will be described with reference to the accompanying drawings. It is noted that, in the following descriptions, a "main scanning direction" will be defined as directions in which laser beams L1 to L4 are scanned on photoconductive bodies D, respectively (see FIG. 3). Directions in which the laser beams L1 to L4 are deflected for the scanning (even though those are spatially different directions) will be referred to the "main scanning direction." Further, a "sub scanning direction" will be defined as a direction perpendicular to the main scanning direction and traveling directions of the laser beams L1 to L4.

Figure 1:
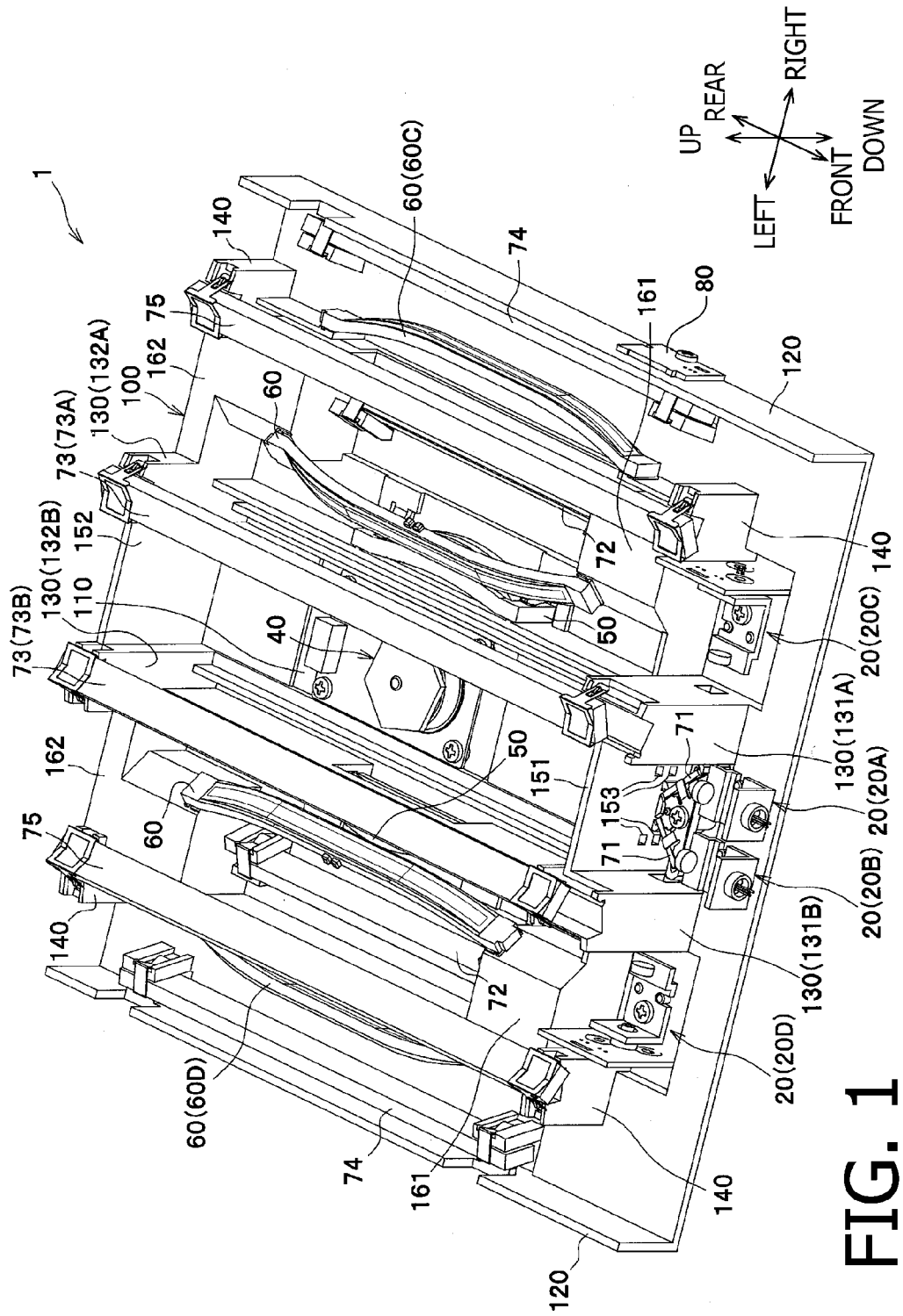
FIG. 1 is a perspective view showing a configuration of an optical scanning device in an embodiment according to one or more aspects of the present invention.

Additionally, in the following descriptions, directions such as a front-to-rear direction, an up-to-down direction (i.e., the vertical direction), and a left-to-right direction for the optical scanning device 1 will be defined as shown in FIG. 1 and other drawings. It is noted that the front-to-rear direction, the up-to-down direction, and the left-to-right direction in the following descriptions may not necessarily correspond to those directions in a situation where the optical scanning device 1 is incorporated in an image forming apparatus.

As shown in FIG. 1, the optical scanning device 1 includes light source units 20 (20A, 20B, 20C, and 20D), first cylindrical lenses 30 (see FIG. 2), a polygon mirror 40, fθ lenses 50, second cylindrical lenses 60, reflecting mirrors 71 to 75, a light detection unit 80, and a casing 100.

Figure 2:
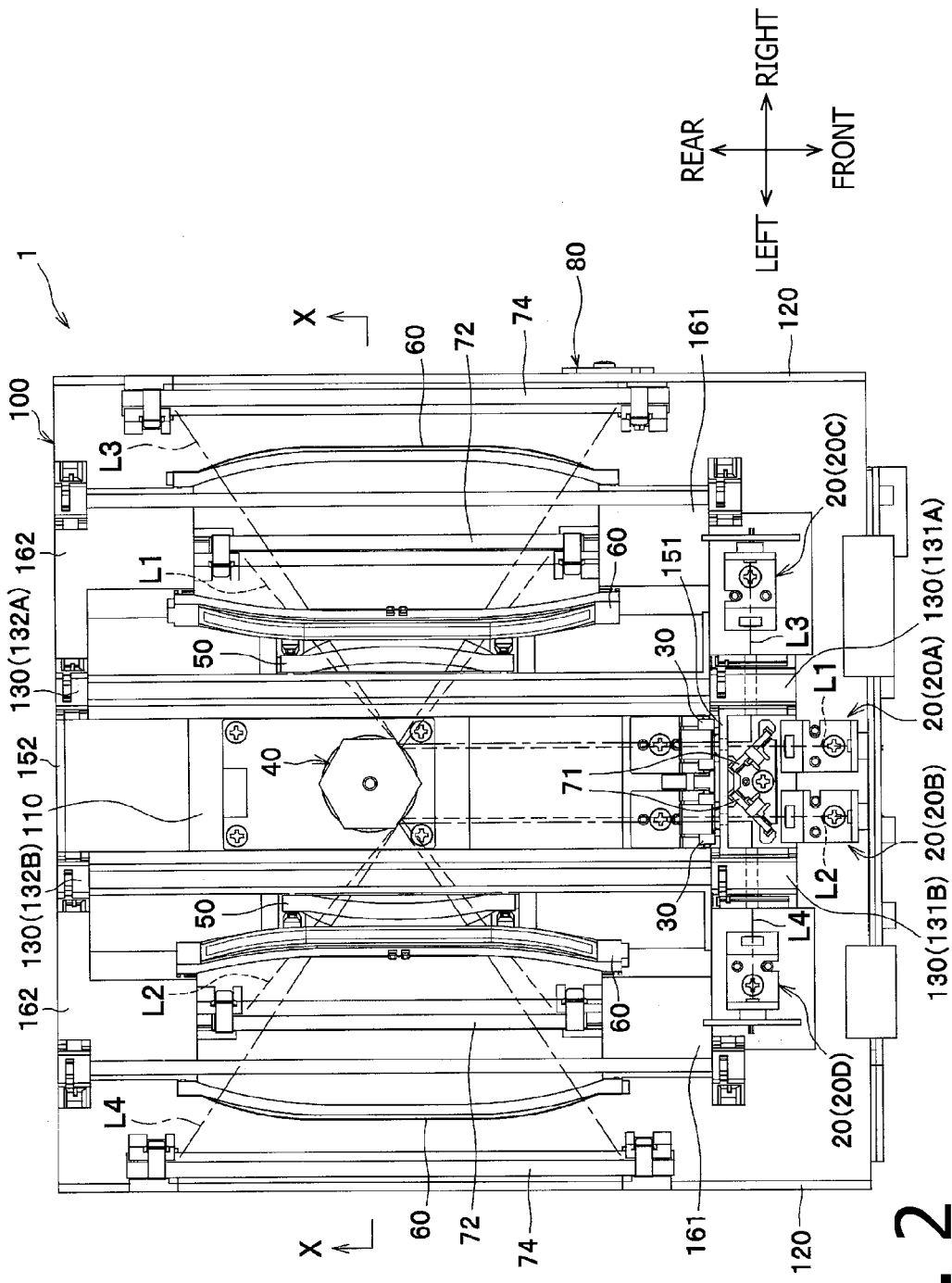
FIG. 2 is a top view showing the configuration of the optical scanning device in the embodiment according to one or more aspects of the present invention.

There are provided four light source units 20 (20A, 20B, 20C, and 20D) that respectively correspond to four photoconductive bodies D to be scanned and exposed by the optical scanning device 1. The light source units 20 (20A, 20B, 20C, and 20D) are configured to emit laser beams L1 to L4 (each of which is emitted in a state converted into a light flux). As shown in FIG. 2, the light source 20A and the light source 20B are arranged in parallel with each other along the left-to-right direction. Further, the light source units 20C and 20D are disposed to face one another in the left-to-right direction so as to emit the laser beam L3 and L4 along the left-to-right direction, which is substantially perpendicular to the direction in which the light source units 20A and 20B emit the laser beams L1 and L2.

Figure 4:
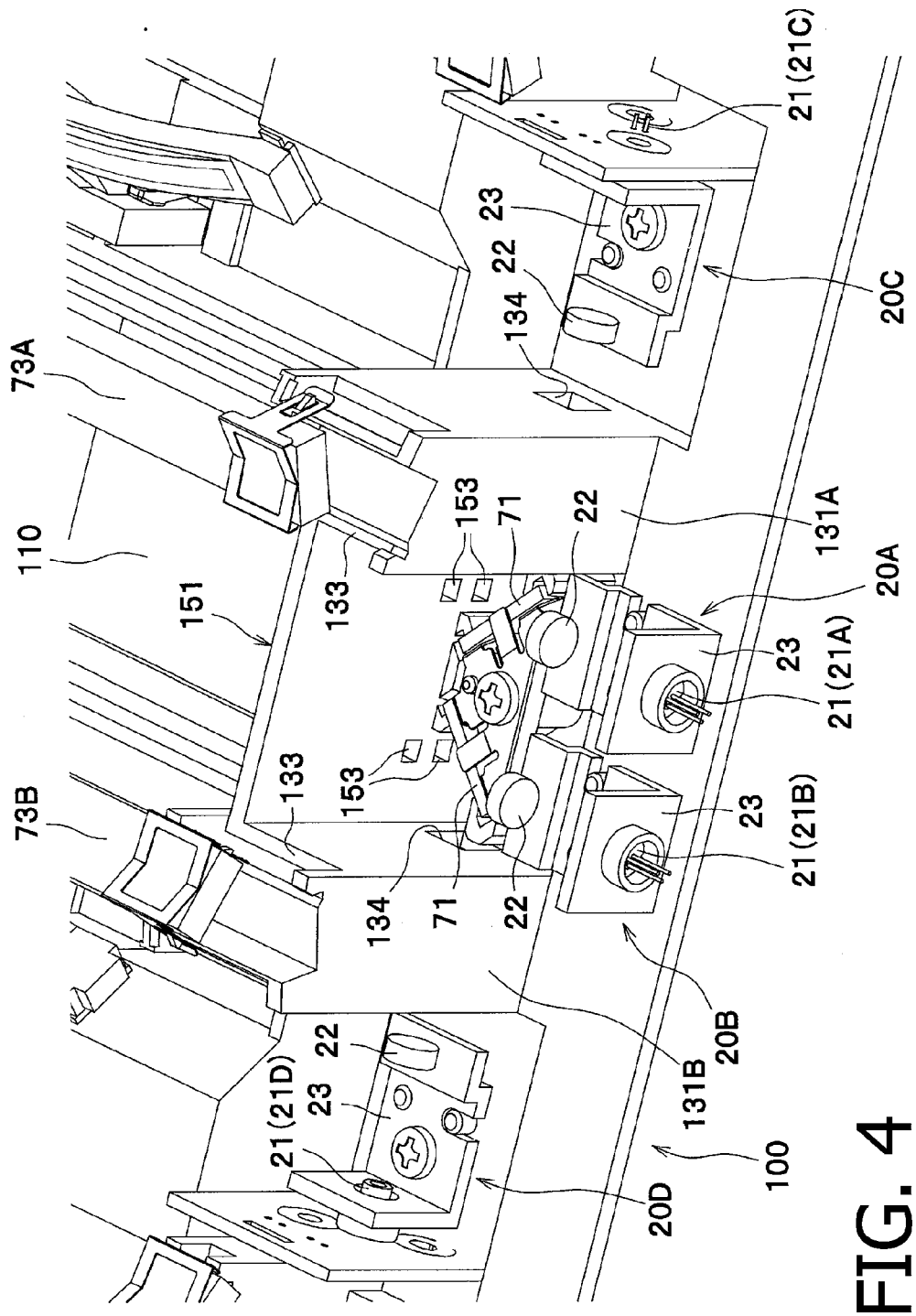
FIG. 4 is an enlarged perspective view showing a part of the optical scanning device around light source units in the embodiment according to one or more aspects of the present invention.

As shown in FIG. 4, each of the light source units 20 (20A, 20B, 20C, and 20D) includes a semiconductor laser 21, a collimating lens 22, and a frame 23.

The semiconductor lasers 21 (21A, 21B, 21C, and 21D) are known devices configured to emit laser light (L1 to L4).

Each collimating lens 22 is configured to converge and convert the laser light (L1 to L4) into a light flux (i.e., a corresponding one of the laser beams L1 to L4). It is noted that, according to aspects of the present invention, the light flux obtained through the conversion by the collimating lens 22 may be any one of parallel light, converging light, and diverging light.

Each frame 23 is a member configured to support the semiconductor laser 21 and the collimating lens 22. The semiconductor laser 21 is fixedly press-fitted into a cylindrical attachment, which is provided at a wall extending vertically from a bottom base of the frame 23. The collimating lens 22 is disposed at a portion higher than the bottom base of the frame 23, so as to face the semiconductor laser 21. Further, the collimating lens 22 is fixed with adhesive agent.

Referring back to FIG. 2, each reflecting mirror 71 is configured to reflect the laser beam L3 from the light source unit 20C or the laser beam L4 from the light source unit 20D toward the polygon mirror 40. The reflecting mirrors 71 are disposed between the polygon mirror 40 and the light source units 20A and 20B in the front-to-rear direction. The laser beam L1 from the light source unit 20A and the laser beam L2 from the light source unit 20B are rendered incident to the polygon mirror 40 after passing over the reflecting mirrors 71, respectively.

In order to correct leaning of mirror surfaces of the polygon mirror 40, each first cylindrical lens 30 is configured to deflect and converge the laser beams L1 and L3 or the laser beams L2 and L4 in the sub scanning direction to have images, each of which has a linear shape elongated in the main scanning direction, formed on the mirror surfaces of the polygon mirror 40. The first cylindrical lenses 30 are disposed between the polygon mirror 40 and the light source units 20A and 20B, more specifically, between the polygon mirror 40 and a below-mentioned reinforcing wall 151.

The polygon mirror 40 includes six mirror surfaces provided in respective positions the same distance away from the rotational axis of the polygon mirror 40. The polygon mirror 40 is configured to, when the mirror surfaces revolve around the rotational axis at a constant speed, deflect the laser beams L1 to L4 transmitted through the first cylindrical lenses 30 in the main scanning direction. The polygon mirror 40 is disposed substantially in the center of the casing 100 so as to face the light source units 20A and 20B in the front-to-rear direction.

There are two fθ lenses 50 provided on left and right sides, respectively. The fθ lenses 50 are configured to have the laser beams L1 to L4, which have been scanned at the same angular velocity by the polygon mirror 40, scanned on surfaces of the respective photoconductive bodies D in the main scanning direction at a constant speed.

There are four second cylindrical lenses 60 (60A, 60B, 60C, and 60D) provided for the laser beams L1 to L4 emitted by the four light source units 20A, 20B, 20C, and 20D, respectively. In order to correct leaning of the mirror surfaces of the polygon mirror 40, the second cylindrical lenses 60 are configured to deflect and converge the laser beams L1 to L4 in the sub scanning direction to have images formed on the surfaces of the photoconductive bodies D, respectively.

Figure 3:
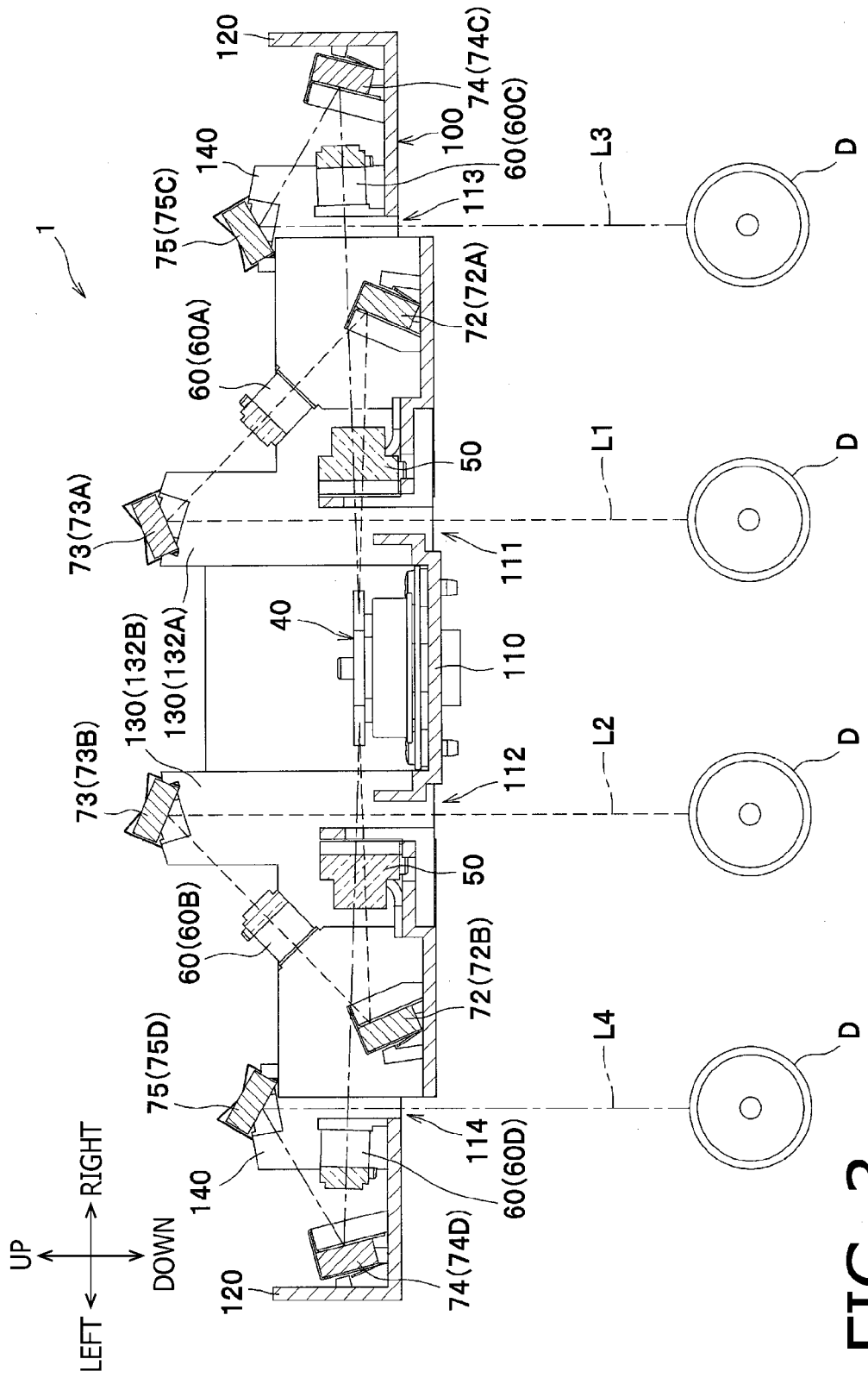
FIG. 3 is a cross-sectional front view of the optical scanning device along an X-X line shown in FIG. 2 in the embodiment according to one or more aspects of the present invention.

As shown in FIG. 3, the second cylindrical lenses 60A and 60B are configured such that the laser beams L1 and L2, deflected by the polygon mirror 40 and then transmitted through the fθ lenses 50, are transmitted therethrough, respectively. The second cylindrical lenses 60A and 60B are disposed above the fθ lenses 50. Further, the second cylindrical lenses 60C and 60D are configured such that the laser beams L3 and L4, deflected by the polygon mirror 40 and then transmitted through the fθ lenses 50, are transmitted therethrough, respectively. Each of the second cylindrical lenses 60C and 60D is disposed to face a corresponding one of below-mentioned side walls 120, between the side wall 120 and a corresponding one of the fθ lenses 50.

There are reflecting mirrors 72 to 75 provided to reflect the laser beams L1 to L4 deflected by the polygon mirror 40 and then transmitted through the fθ lenses 50. Each of the reflecting mirrors 72 to 75 is formed with material having a high reflectance (such as aluminum) being deposited on a surface (to be used as a reflecting surface) of a glass plate.

The reflecting mirrors 72A is disposed between the (right) fθ lens 50 and the second cylindrical lens 60C and configured to reflect the laser beam L1 transmitted through the fθ lens 50 toward the second cylindrical lens 60A. The reflecting mirrors 72B is disposed between the (left) fθ lens 50 and the second cylindrical lens 60D and configured to reflect the laser beam L2 transmitted through the θ lens 50 toward the second cylindrical lens 60B. Further, the reflecting mirror 73A is disposed above the (right) fθ lens 50 and configured to reflect the laser beam L1 transmitted through the second cylindrical lens 60A toward the surface (the scanned surface) of a corresponding one of the photoconductive bodies D. The reflecting mirror 73B is disposed above the (left) fθ lens 50 and configured to reflect the laser beam L2 transmitted through the second cylindrical lens 60B toward the surface (the scanned surface) of a corresponding one of the photoconductive bodies D.

The reflecting mirror 74C is disposed along the (right) side wall 120 of the casing 100, between the second cylindrical lens 60C and the side wall 120. The reflecting mirror 74C is configured to reflect the laser beam L3 transmitted through the second cylindrical lens 60C toward the reflecting mirror 75C. The reflecting mirror 74D is disposed along the (left) side wall 120 of the casing 100, between the second cylindrical lens 60D and the side wall 120. The reflecting mirror 74D is configured to reflect the laser beam L4 transmitted through the second cylindrical lens 60D toward the reflecting mirror 75D. Further, the reflecting mirror 75C is disposed above the second cylindrical lens 60C and configured to reflect the laser beam L3 reflected by the reflecting mirror 74C toward the surface of a corresponding one of the photoconductive bodies D. The reflecting mirror 75D is disposed above the second cylindrical lens 60D and configured to reflect the laser beam L4 reflected by the reflecting mirror 74D toward the surface of a corresponding one of the photoconductive bodies D.

Thus, as shown in FIG. 2, the laser beam L1 from the light source unit 20A is transmitted through the (right) cylindrical lens 30 and deflected in the main scanning direction by the polygon mirror 40. The laser beam L2 from the light source unit 20B is transmitted through the (left) cylindrical lens 30 and deflected in the main scanning direction by the polygon mirror 40. Further, the laser beam L3 from the light source unit 20C is reflected by the (right) reflecting mirror 71 toward the polygon mirror 40, then transmitted through the (right) first cylindrical lens 30, and deflected in the main scanning direction by the polygon mirror 40. The laser beam L4 from the light source unit 20D is reflected by the (left) reflecting mirror 71 toward the polygon mirror 40, then transmitted through the (left) first cylindrical lens 30, and deflected in the main scanning direction by the polygon mirror 40.

Then, as shown in FIG. 3, the laser beam L1 deflected by the polygon mirror 40 is transmitted through the (right) fθ lens 50, reflected by the reflecting mirror 72A, transmitted through the second cylindrical lens 60A, and then reflected by the reflecting mirror 73A, such that the surface of a corresponding one of the photoconductive bodies D is scanned with and exposed to the laser beam L1. The laser beam L2 deflected by the polygon mirror 40 is transmitted through the (left) fθ lens 50, reflected by the reflecting mirror 72B, transmitted through the second cylindrical lens 60B, and then reflected by the reflecting mirror 73B, such that the surface of a corresponding one of the photoconductive bodies D is scanned with and exposed to the laser beam L2. Further, the laser beam L3 deflected by the polygon mirror 40 is transmitted through the (right) fθ lens 50, transmitted through the second cylindrical lens 60C, and then reflected by the reflecting mirror 74C, such that the surface of a corresponding one of the photoconductive bodies D is scanned with and exposed to the laser beam L3. The laser beam L4 deflected by the polygon mirror 40 is transmitted through the (left) fθ lens 50, transmitted through the second cylindrical lens 60D, and then reflected by the reflecting mirror 74D, such that the surface of a corresponding one of the photoconductive bodies D is scanned with and exposed to the laser beam L4.

As shown in FIG. 1, the casing 100 is configured to accommodate the light source units 20, the polygon mirror 40, the second cylindrical lenses 60, and the reflecting mirrors 71 to 75. The casing 100 includes a supporting wall 110, the side walls 120, reflecting mirror supporting portions 130 and 140, reinforcing walls 151 and 152, and reinforcing portions 161 and 162.

The supporting wall 110 is a bottom wall provided at a lower side of the casing 100. The supporting wall 110 is configured to support the light source units 20, the polygon mirror 40, the fθ lenses 50, the second cylindrical lenses 60C and 60D, and the reflecting mirrors 72 and 74. As shown in FIG. 3, the supporting wall 110 includes four exposure openings 111 to 114 configured such that the laser beams L1 to L4, reflected by the reflecting mirrors 73 and 75 toward the surfaces of the photoconductive bodies D, pass therethrough, respectively.

It is noted that although the following feature is not shown in FIG. 3, glasses or lenses through which the laser beams L1 to L4 are transmitted may be fitted into the exposure openings 111 to 114 so as to prevent dust from entering the casing 100.

The side walls 120 extend vertically from two ends of the supporting wall 110 in the left-to-right direction along which the exposure openings 111 to 114 are arranged, respectively.

As shown in FIG. 1, the reflecting mirror supporting portions 131A and 132A are configured to support the reflecting mirror 73A. The reflecting mirror supporting portions 131B and 132B are configured to support the reflecting mirror 73B. Each of the reflecting mirror supporting portions 130 (131A, 132A, 131B, and 132B) extend substantially in a pillar shape upward from the supporting wall 110.

More specifically, the reflecting mirror supporting portions 131A and 132A are respectively disposed ahead of and behind the fθ lenses 50 when viewed along the front-to-rear direction in which the light source units 20A and 20B face the polygon mirror 40 (see FIG. 3 as well), at a right side of the polygon mirror 40. Further, the reflecting mirror supporting portions 131B and 132B are respectively disposed ahead of and behind the θ lenses 50 when viewed along the front-to-rear direction, at a left side of the polygon mirror 40 (at a side opposite to the reflecting mirror supporting portions 131A and 132A across the polygon mirror 40).

It is noted that, in the following descriptions, the reflecting mirror supporting portions 131A and 131B indicate those provided at a front side where the light source units 20 are disposed. Further, the reflecting mirror supporting portions 132A and 132B indicate those provided at a rear side.

The reflecting mirror supporting portions 130 support the reflecting mirrors 73 by upper end portions 133 (see FIG. 4) that are ends opposite to the supporting wall 110. More specifically, the reflecting mirror supporting portions 130 extend up to a position higher than the polygon mirror 40, the upper end portions 133 are located above the polygon mirror 40. Thus, as shown in FIG. 3, the reflecting mirrors 73 (73A and 73B) are disposed at a side opposite to the supporting wall 110 across the polygon mirror 40 (i.e., at a side farther from the supporting wall 110 than from the polygon mirror 40) when viewed along the front-to-rear direction.

As shown in FIG. 2, the reflecting mirror supporting portions 131A and 131B are disposed to pinch the reflecting mirrors 71 in a position between the light source units 20C and 20D that are disposed to face each other in the left-to-right direction. In other words, the reflecting mirror supporting portion 131A is disposed between the light source unit 20C and the polygon mirror 40 on a substantially L-shaped optical path extending from the light source unit 20C to the polygon mirror 40 via the (right) reflecting mirror 71. Further, the reflecting mirror supporting portion 131B is disposed between the light source unit 20D and the polygon mirror 40 on a substantially L-shaped optical path extending from the light source unit 20D to the polygon mirror 40 via the (left) reflecting mirror 71.

Therefore, as shown in FIG. 4, the reflecting mirror supporting portions 131A and 131B include pass openings 134 formed such that the laser beams L3 and L4 pass therethrough, respectively. Thereby, the light source units 20C and 20D do not have to be disposed to avoid the reflecting mirror supporting portions 131A and 131B. Thus, it is possible to enhance flexibility in layout of the light source units 20. Further, it is possible to downsize the supporting wall 110 (the casing 100) in comparison with a configuration that the four light source units 20 and the reflecting mirrors 71 are shifted ahead of the positions shown in FIG. 2. Thus, it is possible to downsize the optical scanning device 1.

As shown in FIG. 1, the reflecting mirror supporting portions 140, which support the reflecting mirrors 75, are formed in a pillar shape extending upward from the supporting wall 110. More specifically, the reflecting mirror supporting portions 140 are provided ahead of and behind the second cylindrical lenses 60C and 60D. The reflecting mirror supporting portions 140 support the reflecting mirrors 75 by upper end portions (reference characters omitted), which are ends opposite to the supporting wall 110, in the same manner as the aforementioned reflecting mirror supporting portions 130.

The reinforcing walls 151 and 152 and the reinforcing portions 161 and 162 are configured to reinforce the casing 100.

The reinforcing wall 151 extends upward from the supporting wall 110, between the polygon mirror 40 and the light source units 20A and 20B, more specifically, between the reflecting mirrors 71 and the first cylindrical lenses 30 (see FIG. 2), so as to continuously connect the reflecting mirror supporting portion 131A and the reflecting mirror supporting portion 131B. In other words, the reinforcing wall 151 is formed integrally with the supporting wall 110 and the reflecting mirror supporting portions 131A and 131B.

As shown in FIG. 4, the reinforcing wall 151 extends from the supporting wall 110 up to a level as high as the upper end portions 133 of the reflecting mirror supporting portions 131A and 131B. According to such a configuration, it is possible to connect the reflecting mirror supporting portion 131A with the reflecting mirror supporting portion 131B via the reinforcing wall 151 over a vertical range from the supporting wall 110 to the upper end portions 133. Thus, it is possible to enhance the strengths of the reflecting mirror supporting portions 131A and 131B and the supporting wall 110.

Figure 5:
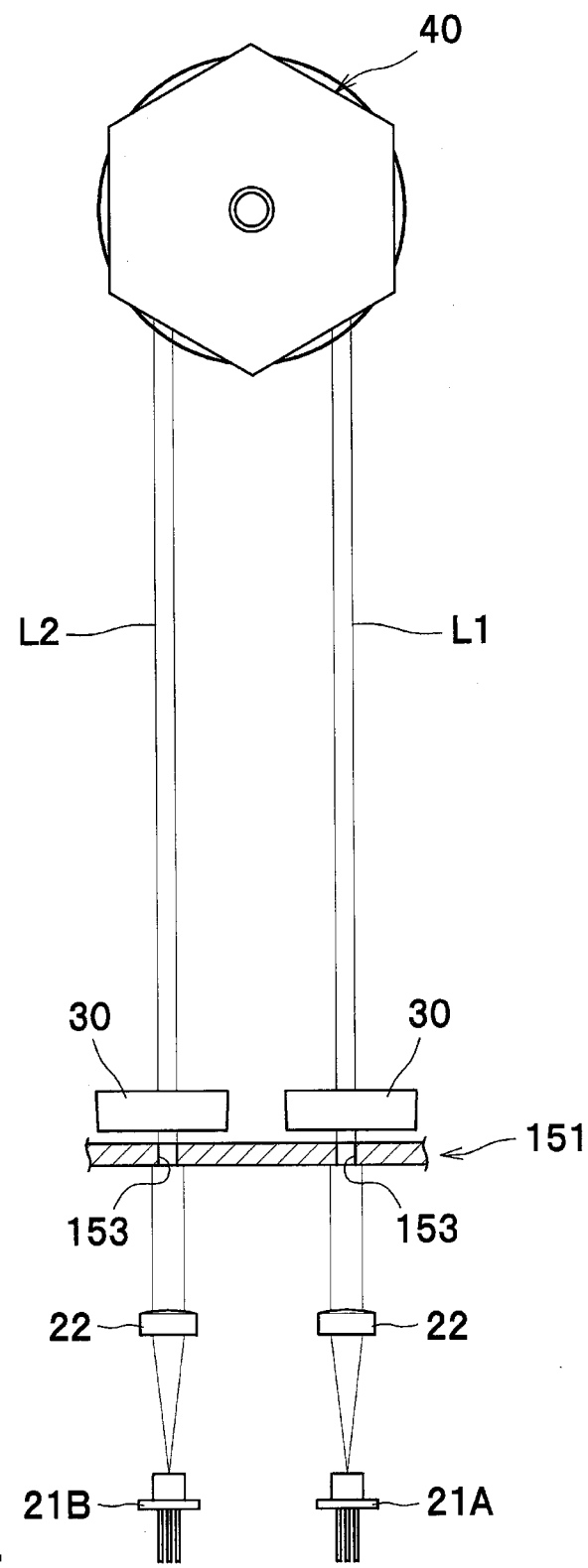
FIG. 5 is a drawing to illustrate how through-holes formed in reinforcing wall function in the embodiment according to one or more aspects of the present invention.

The reinforcing wall 151 includes four through-holes 153 configured such that the laser beam L1 to L4 emitted by the light source units 20 toward the polygon mirror 40 (not shown in FIG. 4) are transmitted therethrough, respectively. Each of the four through-holes 153 is formed substantially in a square shape when viewed from the front side. As shown in FIG. 5, each of the four through-holes 153 serves as an aperture that defines the widths, in the vertical direction and the left-to-right direction, of a corresponding one of the laser beams L1 to L4 emitted by the light source units 20A to 20D (the semiconductor lasers 21A to 21D) and transmitted through the collimating lenses 22. It is noted that FIG. 5 only shows the laser beams L1 and L2 respectively emitted by the semiconductor lasers 21A and 21B and the upper ones of the four through-holes 153 shown in FIG. 4.

Thus, according to the embodiment, it is not required to provide any apertures as separate components. Hence, it is possible to reduce the number of components and the manufacturing cost of the optical scanning device 1, and render easier an assembling work for the optical scanning device 1. Further, light, which does not pass through the through-holes 153 as apertures, is blocked by the reinforcing wall 151 not to reach the polygon mirror 40 or the reflecting mirrors 72 to 75. Thereby, it is possible to prevent undesired light from being reflected by the polygon mirror 40 or the reflecting mirrors 72 to 75, passing through the exposure openings 111 to 114, or reaching the surfaces of the photoconductive bodies D as stray light.

In the embodiment, the first cylindrical lenses 30 are disposed between the reinforcing wall 151 and the polygon mirror 40. Therefore, to the first cylindrical lenses 30, the laser beams L1 to L4 are incident with the widths thereof in the vertical direction and the left-to-right direction being defined by the through-holes 153 serving as apertures. Thereby, it is possible to easily adjust states of the images of the laser beams L1 to L4 on the surfaces of the photoconductive bodies D (or in optical positions corresponding to the surfaces of the photoconductive bodies D).

As shown in FIG. 1, the reinforcing wall 152 extends upward from the supporting wall 110, between the reflecting mirror supporting portions 132A and 132B, so as to continuously connect the reflecting mirror supporting portion 132A and the reflecting mirror supporting portion 132B. The reinforcing wall 152 is formed integrally with the supporting wall 110 and the reflecting mirror supporting portions 132A and 132B, in the same manner as the reinforcing wall 151.

The reinforcing portions 161 and 162 extend upward from the supporting wall 110 and are formed in the shape of walls thick in the front-to-rear direction. The right reinforcing portion 161 is configured to connect the reflecting mirror supporting portion 131A with the (right) reflecting mirror supporting portion 140 disposed at the right side of the reflecting mirror supporting portion 131A. The left reinforcing portion 161 is configured to connect the reflecting mirror supporting portion 131B with the (left) reflecting mirror supporting portion 140 disposed at the left side of the reflecting mirror supporting portion 131A. The right reinforcing portion 161 is formed integrally with the reflecting mirror supporting portion 131A and the (right) reflecting mirror supporting portion 140. The left reinforcing portion 161 is formed integrally with the reflecting mirror supporting portion 131B and the (left) reflecting mirror supporting portion 140.

According to the optical scanning device 1 configured as above, the following operations and effects are provided. The casing 100 includes the reflecting mirror supporting portions 131A and 131B that extend from the supporting wall 110, and the reinforcing wall 151 that extends from the supporting wall 110 and connects the reflecting mirror supporting portion 131A with the reflecting mirror supporting portion 131B. Therefore, it is possible to enhance the strength of the supporting wall 110. Thereby, even though the polygon mirror 40 rotates at a high rotational speed, it is possible to suppress vibrations of the supporting wall 110.

Consequently, for instance, in the case where the optical scanning device 1 is incorporated in an image forming apparatus such as a laser printer, even though the polygon mirror 40 rotates at a high rotational speed, it is possible to expose the surfaces of the photoconductive bodies D by scanning light thereon, in a favorable manner. Thus, it is possible to prevent quality of an image formed by the image forming apparatus from being worsened while making a printing speed of the image forming apparatus higher.

Further, the reinforcing wall 151 includes the through-holes 153 through which the laser beams L1 to L4 emitted by the light source units 20 toward the polygon mirror 40 pass. Therefore, the laser beams L1 to L4 from the light source units 20 are not blocked by the reinforcing wall 151.

Further, in the embodiment, the supporting wall 110 of the casing 100 includes the exposure openings 111 to 114 through which the laser beams L1 to L4 pass, respectively. It might lead to the supporting wall 110 being more likely to vibrate due to high-speed rotation of the polygon mirror 40. However, since the supporting wall 110 is reinforced with the reinforcing walls 151 and 152 and reinforcing portions 161 and 162, it is possible to effectively prevent the supporting wall 110 from vibrating due to high-speed rotation of the polygon mirror 40. The above effects are remarkably exerted in the situation where the supporting wall 110 of the casing 100 includes the exposure openings 111 to 114.

Further, in the embodiment, the reflecting mirrors 73 are disposed in positions higher than the polygon mirror 40, and therefore the reflecting mirror supporting portions 131A and 131B supporting the reflecting mirrors 73 are tall. It might lead to the reflecting mirror supporting portions 131A and 131B being likely to vibrate due to high-speed rotation of the polygon mirror 40. However, the reflecting mirror supporting portion 131A is continuously connected with the reflecting mirror supporting portion 131B via the reinforcing wall 151 over the vertical range from the supporting wall 110 to the upper end portions 133. Thereby, it is possible to enhance the strength of the reflecting mirror supporting portions 131A and 131B and thus prevent the reflecting mirror supporting portions 131A and 131B from vibrating due to high-speed rotation of the polygon mirror 40. Further, it is possible to further enhance the strength of the supporting wall 110 and thus prevent the supporting wall 110 from vibrating due to high-speed rotation of the polygon mirror 40.

As shown in FIG. 7, the light detection unit 80 includes a beam detector 81 configured to detect the laser beam L3, and a circuit board 82 configured such that the beam detector 81 is mounted thereon. The light detection unit 80 is attached to the (right) side wall 120 of the casing 100 from the outside of the casing 100, so as to cover (close) a below-mentioned through-hole 121 formed in the side wall 120 (see FIGS. 11A and 11B as well). Thereby, the beam detector 81 is disposed in a state where a detection surface thereof faces the inside of the casing 100. The light detection unit 80 is configured to issue a signal for determining a moment to start scanning when the beam detector 81 detects the laser beam L3 (a moment for the light source units 20 to emit light).

As described above, the reflecting mirror 74C is disposed along the (right) side wall 120 in which the through-hole 121 is formed, between the second cylindrical lens 60C and the side wall 120. Further, the reflecting mirror 74C includes an end in a longitudinal direction thereof, which end is configured such that light (such as the laser beam L3 and below-mentioned curing light LC) is transmitted therethrough. More specifically, the reflecting mirror 74C, which is formed with material having a high reflectance being deposited on a surface of a glass plate, has a portion, on which a mirror layer M indicated by a dot pattern in FIG. 7, located between the through-hole 121 of the side wall 120 and a below-mentioned lens holding portion 115. Thereby, the laser beam L3 is allowed to be transmitted through the end of the reflecting mirror 74C and detected by the beam detector 81.

As shown in FIGS. 7, 8A, and 8B, the supporting wall 110 includes a lens holding portion 115 formed in a wall shape to hold the second cylindrical lens 60C. The lens holding portion 115 includes a holding surface 116 configured to face the side wall 120 across an end 61 of the second cylindrical lens 60C.

The holding surface 116 is a surface on which light curing resin 190 (see FIG. 9A) is applied as adhesive agent for fixing the second cylindrical lens 60C. Further, the holding surface 116 includes a groove 117 provided to hold the applied light curing resin 190 in a favorable manner.

It is noted that, in the embodiment, for the sake of a simple explanation, the above configuration as shown in FIGS. 7, 8A, and 8B is applied to a region around the (front) end 61 of the cylindrical lens 60C. Nevertheless, needless to mention, the above configuration may be applied to a region around a rear end of the second cylindrical lens 60C and a region around each of the front and rear ends of the second cylindrical lens 60D.

As described above, the side walls 120 extend vertically from the two ends of the supporting wall 110 in the left-to-right direction along which the exposure openings 111 to 114 (see FIG. 3) are arranged, respectively. The (right) side wall 120, at the side of which the second cylindrical lens 60C and the reflecting mirror 74C are disposed, includes the through-hole 121 provided at an area facing the lens holding portion 115. The through-hole 121 is formed in a rectangular shape when viewed along the left-to-right direction. The through-hole 121 is configured such that the inside of the casing 100 is communicated with the outside of the casing 100 therethrough.

As shown in FIG. 8B, the through-hole 121 is formed over a range that covers an entire area of the holding surface 116 when viewed along a direction (i.e., a direction B shown in FIG. 8B) perpendicular to the holding surface 116. In other words, when viewed through the through-hole 121 along the direction B, the holding surface 116 is entirely seen.

Further, the side wall 120 includes a hole 122 formed under the through-hole 121 on an outer surface thereof. The hole 122 is configured to fix the light detection unit 80 onto the side wall 120 with a screw 85 (see FIGS. 11A and 11B).

<Method for Manufacturing Optical Scanning Device>
Subsequently, an explanation will be provided about a method for manufacturing the optical scanning device 1, more specifically, about a method for attaching the second cylindrical lens 60C and the light detection unit 80 to the casing 100, with reference to relevant drawings.

It is noted that the following descriptions will be provided based on an assumption that at least the light source units 20C, the reflecting mirrors 71, the first cylindrical lenses 30, the polygon mirror 40, the fθ lenses 50, and the reflecting mirror 74C have already been attached to the casing 100.

As shown in FIG. 9A, firstly, the light curing resin 190 is applied onto the holding surface 116 of the lens holding portion 115. Next, the second cylindrical lens 60C is placed in a position where the end 61 faces the holding surface 11 via the light curing resin 190 (a lens positioning process).

More specifically, in the lens positioning process of the embodiment, firstly, the end 61 (in an actual process, the two ends) of the second cylindrical lens 60C is grasped by a holding tool 200, and the end 61 is carried to the position to face the holding surface 11 while being grasped by the holding tool 200.

Thereafter, as shown in FIG. 9B, the light source unit 20C is controlled to emit the laser beam L3, and the second cylindrical lens 60C is moved in an X direction, a Y direction, a Z direction, and a θ direction so as to adjust the position of the second cylindrical lens 60C while the state of an image formed in a position corresponding to the surface of the photoconductive body D is being checked.

It is noted that, in the embodiment, the adjustment of the position of the second cylindrical lens 60C is not carried out while the state of an image formed directly on the surface (the scanned surface) of the photoconductive body D is being checked. The adjustment of the position of the second cylindrical lens 60C is carried out with a measurement device that has a sensor configured to measure a light intensity distribution of the laser beam L3 in a position optically equivalent to the surface of the photoconductive body D.

Subsequently, as shown in FIGS. 10A and 10B, an irradiation device 300 is controlled to emit the curing light LC for curing the light curing resin 190 to be incident to the light curing resin 190 on the holding surface 116 via the through-hole 121 of the side wall 120 and the end 61 of the second cylindrical lens 60C. Thereby, the light curing resin 190 is cured, and the second cylindrical lens 60C is fixed to the holding surface 116 of the lens holding portion 115 (a lens fixing process).

In the lens fixing process of the embodiment, as shown in FIG. 10B, the curing light LC is emitted through the through-hole 121 toward the holding surface 116 in a direction perpendicular to the holding surface 116. Thus, with the curing light LC emitted perpendicularly to the holding surface 116, an entire area of the light curing resin 190 applied onto the holding surface 116 is irradiated, since the holding surface 116 is entirely seen when viewed through the through-hole 121 along the direction perpendicular to the holding surface 116 as described above.

Thereby, the entire area of the light curing resin 190 is irradiated with the curing light LC in a substantially even manner. Therefore, the light curing resin 190 is allowed to evenly contract when curing. Consequently, it is possible to prevent the second cylindrical lens 60C from being positioned in an undesired manner and to enhance accuracy of attaching the second cylindrical lens 60C.

Further, in the embodiment, the end of the reflecting mirror 74C previously attached is configured such that the curing light LC is transmitted therethrough. Therefore, it is possible to fix the second cylindrical lens 60C by irradiating the light curing resin 190 on the holding surface 116 with the curing light LC in the state where the reflecting mirror 74C is attached to the casing 100. Thereby, it is possible to adjust the position of the second cylindrical lens 60C after the reflecting mirror 74C is definitely positioned. Thus, it is possible to enhance the accuracy of attaching the second cylindrical lens 60C.

After that, as shown in FIGS. 11A and 11B, the light detection unit 80 is attached to the side wall 120 from the outside with the screw 85, so as to cover the through-hole 121 of the side wall 120 (a part attaching process). Thereby, the light detection unit 80 is attached to the casing 100. Thus, it is possible to prevent the laser beam L3 from leaking out of the inside of the optical scanning device 1 via the through-hole 121 and to block entry of dust into the optical scanning device 1.

According to the optical scanning device 1 configured as above in the embodiment, the (right) side wall 120 includes the through-hole 121 provided at an area facing the lens holding portion 115. As implemented in the aforementioned manufacturing method, when the curing light LC is emitted toward the light curing resin 190 on the holding surface 116 via the through-hole 121, the light curing resin 190 is evenly irradiated with the curing light LC. Thereby, the light curing resin 190 contracts in a substantially even manner when curing. Hence, it is possible to prevent the second cylindrical lens 60C from being positioned in an undesired manner and to enhance the accuracy of attaching the second cylindrical lens 60C.

Further, the above configuration makes it possible to place the side wall 120 closer to the second cylindrical lens 60C.

Namely, it is possible to downsize the casing 100 and thus downsize the optical scanning device 1.

Further, the through-hole 121 of the side wall 120 is covered with the light detection unit 80 attached to the side wall 120. Thus, it is possible to more easily assemble the optical scanning device 1 than when a separate member prepared only for covering the through-hole 121 is attached.

Further, according to the method for manufacturing the optical scanning device 1 of the embodiment, the curing light LC is emitted to be incident onto the light curing resin 190 via the through-hole of the side wall 120. Therefore, even in the optical scanning device 1 downsized with a small clearance between the side wall 120 and the second cylindrical lens 60C, it is possible to evenly irradiate the light curing resin 190. Thereby, as described above, it is possible to enhance the accuracy of attaching the second cylindrical lens 60C. Further, by employing the method for manufacturing the optical scanning device 1 of the embodiment, it is possible to manufacture the optical scanning device 1 more downsized than a known optical scanning device.

Further, in the part attaching process, the light detection unit 80 is attached to the side wall 120 to cover (close) the through-hole 121. Therefore, it is possible to more easily assemble the optical scanning device 1 than when the part attaching process includes a step of attaching a separate member prepared only for covering the through-hole 121 and a step of attaching the light detection unit 80.

Hereinabove, the embodiment according to aspects of the present invention has been described. The present invention can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present invention. However, it should be recognized that the present invention can be practiced without reapportioning to the details specifically set forth. In other instances, well known processing structures have not been described in detail, in order not to unnecessarily obscure the present invention.

Only an exemplary embodiment of the present invention and but a few examples of their versatility are shown and described in the present disclosure. It is to be understood that the present invention is capable of use in various other combinations and environments and is capable of changes or modifications within the scope of the inventive concept as expressed herein. For example, the following modifications are feasible.

In the aforementioned embodiment, the light source unit 20A (the semiconductor laser 21A) and the light source unit 20B (the semiconductor laser 21A) are arranged in parallel with each other. Further, the light source unit 20C (the semiconductor laser 21C) and the light source unit 20D (the semiconductor laser 21D) are disposed to face each other so as to emit the laser beam L3 and L4 along the left-to-right direction, which is substantially perpendicular to the directions in which the light source units 20A and 20B emit the laser beams L1 and L2, respectively. However, as shown in FIG. 6, the four semiconductor lasers 21A to 21D may be arranged along the left-to-right direction with laser emitting surfaces thereof (from which the laser beams L1 to L4 are emitted) facing the polygon mirror 40.

In the configuration shown in FIG. 6, the reflecting mirror supporting portion 131A may be disposed in a position between the semiconductor laser 21C and the polygon mirror 40 on an optical path of the laser beam L3 in the casing 100.

Further, the reflecting mirror supporting portion 131B may be disposed in a position between the semiconductor laser 21D and the polygon mirror 40 on an optical path of the laser beam L4 in the casing 100. In this case, the reflecting mirror supporting portions 131A and 131B include through-holes 134 through which the laser beams L3 and L4 pass, respectively. Thereby, it is possible to enhance flexibility in layout of the semiconductor lasers 21C and 21D, as effectively as the aforementioned embodiment. Further, according to the configuration shown in FIG. 6, the optical scanning device 1 may be configured without the reflecting mirrors 71 described in the aforementioned embodiment. Thus, it is possible to reduce the number of components of the optical scanning device 1.

In the aforementioned embodiment, the reinforcing wall 151 extends from the supporting wall 110 up to the level as high as the upper end portions 133. However, the height of the reinforcing wall 151 may be above or below the height from the supporting wall 110 to the upper end portions 133 of the reflecting mirror supporting portions 131A and 131B described in the aforementioned embodiment.

In the aforementioned embodiment, the through-holes 153 serving as apertures are formed to define the widths of the laser beams L1 to L4 in the vertical direction and the left-to-right direction. However, the through-holes 153 may be formed to define the widths of the laser beams L1 to L4 in only one of the vertical direction and the left-to-right direction.

In the aforementioned embodiment, the through-holes 153 of the reinforcing wall 151 serve as apertures that define the widths of the laser beams L1 to L4. However, the through-holes 153 may have an opening large enough not to block the laser beams L1 to L4. In this case, separate aperture members may be provided.

In the aforementioned embodiment, the reinforcing wall 151 includes the four through-holes 153 configured such that the laser beams L1 to L4 pass therethrough. However, the reinforcing wall 151 may include two through-holes, i.e., one through-hole configured such that the laser beams L1 and L2 pass therethrough and the other through-hole configured such that the laser beams L3 and L4 pass therethrough. Alternatively, the reinforcing wall 151 may include a single through-hole.

In the aforementioned embodiment, the optical scanning device 1 includes the two first cylindrical lenses 30. However, instead of the two first cylindrical lenses 30, a single converging lens may be provided. Furthermore, in the configuration shown in FIG. 6, four converging lenses may be provided that correspond to the four light sources, i.e., the semiconductor lasers 21A to 21D, respectively.

In the aforementioned embodiment, the supporting wall 110, which is a bottom wall of the casing 100, includes the exposure openings 111 to 114. However, for instance, a cover, which may be attached to the casing 100 so as to cover optical elements provided in the casing 100 and form a housing of the optical scanning device 1 together with the casing 100, may include one or more exposure openings.

In the aforementioned embodiment, the semiconductor lasers 21 are exemplified as light sources, each of which is configured to emit a single laser beam. However, instead of the semiconductor lasers 21, one or more light sources may be provided, each of which may include a plurality of light emitting points so as to emit a plurality of laser beams.

In the aforementioned embodiment, the polygon mirror 40 is exemplified as a deflector, which includes six mirror surfaces. However, the polygon mirror 40 may include four mirror surfaces. Further, in the aforementioned embodiment, the polygon mirror 40 is configured to rotate to deflect laser beams. However, instead of the polygon mirror 40, a swinging mirror may be provided that is configured to swing to deflect laser beams.

In the aforementioned embodiment, the optical scanning device 1 is exemplified that is configured to be incorporated in an image forming apparatus such as a laser printer. However, the optical scanning device 1 may be incorporated in a measurement apparatus or an inspection apparatus.

In the aforementioned embodiment, the light detection unit 80 is exemplified as a component of the optical scanning device 1 to be attached to the side wall 120 to cover (close) the through-hole 121. However, for instance, as shown in FIGS. 12A and 12B, a holding member 90, which may be configured to make the casing 100 (the side wall 120) hold a reflecting mirror 74C, may be attached to the side wall 120 so as to cover (close) the through-hole 121.

More specifically, the holding member 90 may be a clip member that is formed from metal or resin and formed in substantially a U-shape when viewed along the front-to-rear direction of the optical scanning device 1. The holding member 90 may be configured to pinch the reflecting mirror 74C and a portion of the side wall 120 where the through-hole 121 is formed. Thereby, the reflecting mirror 74C is (fixedly) held by the casing 100, and the through-hole 121 is closed. Such a holding member may be configured to make the casing 100 hold the aforementioned light detection unit 80.

Further, examples of a component of the optical scanning device 1 to be attached to the side wall 120 to cover (close) the through-hole 121 may include a reflecting mirror 76 as shown in FIG. 13. More specifically, in a modification shown in FIG. 13, the optical scanning device 1 may have the light detection unit 80 disposed in the casing 100, and the reflecting mirror 76 may be configured to reflect the laser beam L3 transmitted through the second cylindrical lens 60C toward the beam detector 81 of the light detection unit 80.

When grasped by (attached to) an attachment portion 123 provided on the inner surface of the side wall 120, the reflecting mirror 76 covers the through-hole 121. Alternatively, for instance, the reflecting mirror 76 may be fixedly attached with adhesive agent so as to cover the through-hole 121 from the inside or the outside of the side wall 120.

In the aforementioned embodiment, in the lens fixing process, the curing light LC is emitted to be perpendicularly incident onto the holding surface 116. However, the curing light LC may be emitted to be incident onto the holding surface 116 with a certain level of angle relative to the direction perpendicular to the holding surface 116 as far as the light curing resin 190 can evenly contract when curing.

In the aforementioned embodiment, in the lens positioning process, the light curing resin 190 is applied onto the holding surface 116 of the lens holding portion 115. However, for instance, the light curing resin 190 may be applied onto a scanning lens (e.g., the second cylindrical lens 60C of the aforementioned embodiment) instead of the holding surface 116. Alternatively, the light curing resin 190 may be poured into a space between a scanning lens and the holding surface 116 after the scanning lens is disposed to face the holding surface 116.

In the aforementioned embodiment, in the lens positioning process, the position of the second cylindrical lens 20C is adjusted. However, for instance, when adjustment of the state of an image formed on a scanned surface is made by adjusting the position of an optical component other than a scanning lens such as the second cylindrical lens 20C, the scanning lens (e.g., second cylindrical lens 20C) may be fixed to the casing 100 without the position thereof being adjusted. Alternatively, in the lens positioning process, the scanning lens (e.g., the second cylindrical lens 20C) may be positioned in a coarse manner.

In the aforementioned embodiment, the end of the reflecting mirror 74C is configured such that the curing light LC is transmitted therethrough. Therefore, in the state where the reflecting mirror 74C is attached to the casing 100, the curing light LC is emitted via the through-hole 121 to be incident onto the light curing resin 190. However, the second cylindrical lens 60C may be attached to the casing 100 before the reflecting mirror 74C is attached to the casing 100. In this case, the reflecting mirror 74C may include a mirror layer M formed over an entire area of a surface functioning as a reflecting mirror.

In the aforementioned embodiment, the through-hole 121 is formed in the side wall 120 in substantially a rectangular shape. However, the through-hole 121 may be formed in a round shape, an ellipsoidal shape, an oval shape, or a polygonal shape other than the rectangular shape. Further, instead of the through-hole 121, a notch may be formed in the side wall 120.

In the aforementioned embodiment, the second cylindrical lenses 60 are exemplified as scanning lenses. However, instead of the second cylindrical lenses 60, fθ lenses may be employed as scanning lenses.

In the aforementioned embodiment, the optical scanning device 1 is a multi-beam type device having the plurality of light source units 20. However, the optical scanning device 1 may be a single-beam type device having a single light source.

What is claimed is:

1. An optical scanning device comprising:
a first light source unit configured to emit a first laser beam;
a second light source unit configured to emit a second laser beam;
a deflector disposed to face the first and second light source units in a predetermined direction, the deflector being configured to reflect and deflect the first laser beam emitted by the first light source unit and the second laser beam emitted by the second light source unit in a main scanning direction;
a first reflecting mirror configured to reflect the first laser beam deflected by the deflector toward a first scanned surface;
a second reflecting mirror configured to reflect the second laser beam deflected by the deflector toward a second scanned surface; and
a casing configured to accommodate the first light source unit, the second light source unit, the deflector, the first reflecting mirror, and the second reflecting mirror, the casing comprising:
a supporting wall configured to support the deflector;
a first reflecting mirror supporting portion formed in a pillar shape to extend from the supporting wall, the first reflecting mirror supporting portion being configured to support the first reflecting mirror;
a second reflecting mirror supporting portion formed in a pillar shape to extend from the supporting wall at a side opposed to the first reflecting mirror supporting portion across the deflector in a direction perpendicular to the predetermined direction, the second reflecting mirror supporting portion being configured to support the second reflecting mirror; and
a reinforcing wall disposed in a position separated from the first and second light source units in the predetermined direction, the position being between the deflector and the first and second light source units, the reinforcing wall extending from the supporting wall and linearly extending in the direction perpendicular to the predetermined direction throughout a whole distance between the first reflecting mirror supporting portion and the second reflecting mirror supporting portion, the reinforcing wall comprising a first through-hole configured such that the first laser beam emitted by the first light source unit toward the deflector and the second laser beam emitted by the second light source unit toward the deflector pass therethrough.

2. The optical scanning device according to claim 1, wherein the first through-hole is configured to serve as an aperture defining a width of at least one of the first laser beam and the second laser beam.

3. The optical scanning device according to claim 2, further comprising an imaging lens configured to converge the first laser beam and the second laser beam to have respective images formed on a reflecting surface of the deflector, the imaging lens being disposed between the reinforcing wall and the deflector.

4. The optical scanning device according to claim 1,
wherein the first reflecting mirror supporting portion is configured to support the first reflecting mirror at an end opposite to the supporting wall,
wherein the second reflecting mirror supporting portion is configured to support the second reflecting mirror at an end opposite to the supporting wall, and
wherein the reinforcing wall extends from the supporting wall to the end of the first reflecting mirror supporting portion and the end of the second reflecting mirror supporting portion.

5. The optical scanning device according to claim 4,
wherein the first reflecting mirror and the second reflecting mirror are disposed at a side opposed to the supporting wall across the deflector in a direction perpendicular to the predetermined direction.

6. The optical scanning device according to claim 1, wherein the supporting wall comprises:
a first exposure opening configured such that the first laser beam reflected by the first reflecting mirror toward the first scanned surface passes therethrough; and
a second exposure opening configured such that the second laser beam reflected by the second reflecting mirror toward the second scanned surface passes therethrough.

7. The optical scanning device according to claim 1, further comprising a third light source unit configured to emit a third laser beam,
wherein the first reflecting mirror supporting portion is disposed in a position between the third light source unit and the deflector, on an optical path of the third laser beam in the casing, and
wherein the first reflecting mirror supporting portion comprises a pass opening configured such that the third laser beam passes therethrough.

8. The optical scanning device according to claim 1, further comprising a scanning lens configured such that a laser beam deflected by the deflector is transmitted therethrough,
wherein the casing comprises a side wall extending from the supporting wall,
wherein the supporting wall comprises a lens holding portion that has a holding surface formed to face the side wall across the scanning lens, the holding surface being configured to hold the scanning lens attached thereto with light curing resin,
wherein the side wall comprises a second through-hole formed at a portion thereof opposed to the lens holding portion, the second through-hole being configured such that an inside of the casing is communicated with an outside of the casing therethrough, and
wherein the optical scanning device further comprises a through-hole covering member attached to the side wall so as to cover the second through-hole, the through-hole covering member being configured to serve as at least one of an optical component, a light detection unit, and a holding member that causes the casing to hold one of the optical component and the light detection unit.

9. The optical scanning device according to claim 8, further comprising a third reflecting mirror configured to reflect the laser beam transmitted through the scanning lens toward a scanned surface,
wherein the third reflecting mirror is disposed along the side wall, between the scanning lens and the side wall with the second through-hole formed therein, in the casing, and
wherein the third reflecting mirror comprises a transmission section located between the second through-hole and the lens holding portion, the transmission section being configured such that light for curing the light curing resin is transmitted therethrough.

10. The optical scanning device according to claim 9,
wherein the second through-hole is formed over a range that covers an entire area of the holding surface when viewed along a direction perpendicular to the holding surface.

11. The optical scanning device according to claim 9,
wherein the second through-hole is formed such that an entire area of the holding surface is irradiated with light emitted therethrough in a direction perpendicular to the holding surface.

* * * * *